United States Patent
Sommer et al.

(10) Patent No.: US 7,276,203 B2
(45) Date of Patent: Oct. 2, 2007

(54) PROCESS FOR PRODUCING HOLLOW COMPRISING FIBER-REINFORCED CERAMIC MATERIALS

(75) Inventors: Arno Sommer, Bobingen (DE); Dieter Huber, Augsburg (DE); Dunja Straub, Donauwoerth (DE)

(73) Assignee: Audi AG (DE)

( * ) Notice: Subject to any disclaimer, the term of this patent is extended or adjusted under 35 U.S.C. 154(b) by 495 days.

(21) Appl. No.: 10/741,374

(22) Filed: Dec. 18, 2003

(65) Prior Publication Data

US 2004/0130046 A1 Jul. 8, 2004

(30) Foreign Application Priority Data

Dec. 20, 2002 (DE) ................. 102 60 923

(51) Int. Cl.
*C01B 31/00* (2006.01)
*B29D 22/00* (2006.01)

(52) U.S. Cl. ............... 264/635; 264/29.7; 264/656; 264/657

(58) Field of Classification Search ........ 264/632–635, 264/29.6, 29.7, 656, 657, 649, 671
See application file for complete search history.

(56) References Cited

U.S. PATENT DOCUMENTS

| | | | |
|---|---|---|---|
| 6,030,913 A * | 2/2000 | Heine et al. .................. 501/88 |
| 6,086,814 A | 7/2000 | Krenkel et al. |
| 6,231,791 B1 | 5/2001 | Heine et al. ................ 264/29.5 |
| 7,011,785 B2 * | 3/2006 | Bauer et al. ................. 264/405 |
| 2003/0118757 A1 | 6/2003 | Bauer et al. |
| 2006/0071373 A1 * | 4/2006 | Bauer et al. ................. 264/610 |

FOREIGN PATENT DOCUMENTS

| | | |
|---|---|---|
| DE | 19710105 | 9/1998 |
| DE | 10148658 | 2/2003 |
| DE | 10148659 | 2/2003 |
| DE | 10234400 | 3/2003 |
| EP | 0788468 | 10/1995 |
| WO | WO-96/13470 | 5/1996 |

* cited by examiner

*Primary Examiner*—Carlos Lopez
(74) *Attorney, Agent, or Firm*—Connolly Bove Lodge & Hutz LLP

(57) ABSTRACT

A process for producing hollow bodies comprising fiber-reinforced ceramic materials, in which a green body comprising compressible cores and a mouldable composition comprising binders and fiber material which is pressed with compression of the core is produced, the green body is cured and carbonized and pyrolysed by heating in a nonoxidizing atmosphere and, if desired, the body is silicized, hollow bodies produced in this way and their use, in particular as brake and clutch disks

9 Claims, No Drawings

PROCESS FOR PRODUCING HOLLOW COMPRISING FIBER-REINFORCED CERAMIC MATERIALS

FIELD OF THE INVENTION

The present invention relates to a process for producing hollow bodies comprising fiber-reinforced ceramic materials. In particular, the invention relates to a process for the production of a porous fiber-reinforced carbon-containing shaped body having recesses or hollow spaces, in particular a fiber-reinforced C/C body (carbon reinforced with carbon fibers, "CFC", or "CFRC", carbon fiber reinforced carbon), close to its final shape, which is shaped from binder-containing fiber compositions by means of a pressing process using pressing cores and converted in a subsequent thermal treatment into a C/C body, and also, if desired, after-densification of this porous fiber-reinforced carbon-containing shaped body with formation of a ceramic matrix, in particular by infiltration of liquid metal into the C/C body, if desired with subsequent heat treatment so that the matrix then comprises metals and the metal carbides formed by reaction with the carbon and possibly residual unreacted carbon.

For the present purposes, "metals" are all elements which form carbides which are solid at room temperature, i.e. including, in particular, silicon.

The process of the invention relates in particular to the production of ceramic composites which are reinforced with carbon fibers and have recesses and hollow spaces and are converted by infiltration with silicon melts, which result in at least part of the carbon reacting to form silicon carbide, into composites which are reinforced with carbon fibers and have an SiC-containing or carbon- and SiC-containing matrix (C/SiC or C/C—SiC material). These composites are employed, in particular, in brake, clutch and friction disks, and also as materials of construction which are resistant to high temperatures.

BACKGROUND OF THE INVENTION

Processes for producing C/SiC components have been known, for example from the patent application DE-A 197 10 105, and comprise, inter alia, the following steps:

production of a mouldable mixture of, firstly, carbon-containing fibers or fiber bundles (hereinafter referred to collectively as "fiber material"), where the fibers may be provided with a coating, and, secondly, fillers and/or binders such as resins and/or pitch, shaping of the mouldable mixture under pressure and at elevated temperature, and carbonization of the carbon-containing fillers and binders to produce a shaped body, in particular a shaped body consisting of carbon reinforced with carbon fibers (C/C), and, if desired, graphitization of the shaped body, infiltration of at least an outer layer of the shaped body with a silicon melt and at least partial reaction of the silicon with the carbon in the shaped body to form SiC, thus producing a shaped body which consists, at least in the outer layer, of a composite ceramic having carbon-containing fibers embedded in a matrix comprising predominantly SiC, Si and C (here also referred to as C/SiC).

In the following, "C/SiC" should in general be taken to encompass materials variants in which, as described above, only an outer layer is silicized.

Present-day metallic brake disks frequently have ventilation slots or channels within the disk through which air flows in order to reduce the temperature level of the disk and decrease the wear of the friction linings under high stress. Such ventilation channels are also provided in brake disks based on C/SiC, especially to reduce the temperature level so as to spare the brake linings and further system components.

A process for producing friction units comprising C/C—SiC material with ventilation channels, hollow spaces and recesses, in which a structured porous carbon body close to its final shape is infiltrated with liquid silicon, has been known from EP-B 0 788 468. This process makes use of the fact that infiltration with liquid silicon and formation of the Si- and SiC-rich matrix of the composite proceeds to completion virtually without any change in the geometry of the C/C intermediate body, so that the hollow spaces and recesses can be produced in the relatively soft and readily machinable C/C intermediate body and not only in the very hard C/C—SiC composite ceramic. It is proposed, inter alia, that the hollow spaces and recesses be formed by means of soluble cores of polystyrene foam or other rigid foams, by means of pyrolysable cores of polyvinyl alcohol or by means of rubber, metal or ceramic cores which can be taken out. The material of the cores forms the ventilation channels of the friction unit, with the webs between the individual ventilation channels being defined by the appropriate voids within the core material.

In the German patent application DE A 102 34 400, a process for producing hollow bodies is disclosed in which cores of compressible materials which have been compressed by at least 5% of their length in the pressing direction during pressing are used. The cores can be made up of a plurality of layers, with the outer (covering) layers being stiff and the inner layer being compressible.

Although this process allows better compaction of the mouldable mixture in the region of the webs of the pressed body which are formed in the position of the voids in the cores, it has been found that both in the case of the single-layer embodiment and in the case of the multilayer embodiment described having a compressible layer in the interior and stiff covering layers, compression of the core material exerts a pressure on the sides of the webs which, particularly in the case of narrow webs and wide voids, can lead to undesirable deformation.

It is therefore an object of the invention to provide a process and develop a core material matched thereto, by means of which it is possible to obtain fiber-reinforced hollow ceramic bodies which have uniform densification over the entire body and by means of which even narrow webs with pre-defined contours can be produced in the interior without deformation. Furthermore, the cores should be such that they can be removed gently and in a simple manner from the hollow body.

SUMMARY OF THE INVENTION

According to the invention, this object is achieved in a pressing process using a punch which covers the entire area of the compact by providing compressible cores which during the pressing process experience a length change of at least 5% at least in the direction of movement of the punch, where the cores consist of a material which is either completely pyrolysed during the further thermal treatment of the fiber-containing intermediate body or is at least partly decomposed with volume shrinkage and the cores have at least three layers in the pressing direction, with the compressibility of directly adjacent layers differing and the compressibility in the outermost layers preferably being identical in each of them and being at least twice of that in the inner layer.

The invention accordingly provides a process for producing hollow bodies comprising fiber-reinforced ceramic materials, which comprises in a first step producing compressible cores whose shape corresponds, at least in the plane perpendicular to the pressing direction, essentially to the geometry of the hollow spaces to be formed, in a second step producing a green body by introducing the compressible cores mentioned and a mouldable composition comprising binder and fiber material into a mould, in a third step pressing the composition containing fiber material so that the core is compressed in the pressing direction by at least 5% of its dimension in the pressing direction, in a fourth step curing the composition comprising fiber material, preferably by heating to a temperature of from 120° C. to 280° C., where the third and fourth steps may also be carried out simultaneously or partly overlapping in time, in a fifth step carbonizing the strengthened green body, also referred to as intermediate body, by heating to a temperature of from about 750° C. to about 1 100° C. in a nonoxidizing atmosphere to give a C/C body, and, if desired, in a sixth step infiltrating the C/C body with a liquid metal with retention of its shape and with an at least partial reaction of the carbon component of the matrix of the C/C body with the metal occurring to form carbides, where the cores consist of material which pyrolyses in the fifth step or is at least partially pyrolysed with volume shrinkage and the cores have at least three layers in the pressing direction, with the compressibility of directly adjacent layers differing and the compressibility of the inner layer being lower than that of the outer layers.

DETAILED DESCRIPTION OF THE PREFERRED EMBODIMENTS

The compressibility of the material of the inner (middle) layer is at least 5%, preferably at least 10% and in particular at least 15%, lower than that of the material of an outer layer. The compressibility in the outermost layers is preferably identical in each of these and is at least twice that in the inner (middle) layer.

In the present context, a composition is referred to as "mouldable" when it retains its shape after compaction in the pressing process and subsequent release of the pressure and does not crumble readily.

The fiber-reinforced hollow ceramic bodies produced by this process have a fiber density in the material in the region of the webs which is not less than that in the layers above and below and are homogeneous without phase boundaries being detectable as the transition between the core zone and the adjoining layers of material.

According to the invention, this is achieved by carrying out the process using compressible cores which are compressed in the pressing direction during the pressing process and have at least three layers in the pressing direction comprising materials of differing compressibility, with the compressibility of the material of the inner layer being lower than that of the material of the outer layers. The thickness change in the pressing direction can be adjusted in a targeted way via the material and geometry of the core. During the pressing process, the compressible core is compressed to a thickness which can be defined beforehand, so that the compaction ratio of the mouldable composition in the voids in the cores can be set to a particular value.

Preference is given to cores which can be compressed in the pressing direction by at least 5% of their initial thickness during pressing. The spring-back force of the material is preferably so low that the cured green body is not damaged when the pressure is released. For this reason, elastomers or rubber, for example, are not suitable as core material.

The linear compressibility of the cores used according to the invention, i.e. the relative length change in the direction of the movement of the punch, is at least 5% of the initial thickness. The cores are preferably compressed in the pressing direction to 2% to 80%, particularly preferably to 5% to 75%, of their initial thickness.

The strength of the cores is selected so that a pressing pressure in the range from 0.1 to 50 MPa is sufficient to achieve the desired compression.

In one embodiment of the invention, the cores are produced from fusible materials selected from among thermoplastic polymers (plastics) which can be pyrolysed without leaving a residue, hereinafter also referred to as thermoplastic cores. The thermoplastic material for the inner layer of the core is preferably selected so that its melting point is above the curing temperature of the shaping process for the green body, typically in the range from 120° C. to 300° C., but significantly below the carbonization temperature of the pressed and cured green body. The melting point is usually at least 150° C., preferably at least 180° C. and particularly preferably in the range from 220° C. to 280° C. If thermal curing of the mouldable mixture is carried out only after the press has been brought together to the final dimensions, it is also possible to use core materials which melt or decompose at or below the curing temperature, since the mouldable composition then has already acquired its final shape. If phenolic resins are chosen as binders for the mouldable mixtures, the melting point of the thermoplastic is, for example, preferably above 150° C. For the preferred shaping by pressing and hot curing of the binders, the thermoplastic core has to meet demanding requirements in terms of the heat distortion resistance. The heat distortion temperature (determined in accordance with ISO 75A) is usually above 80° C., particularly preferably at least 150° C. The hardness (ball indentation hardness) of the thermoplastic should be at least 30 MPa.

If thermoplastic polymers are used as material for the cores, the cores are preferably produced by an injection-moulding process. Known shaping methods such as cold or hot pressing, casting, pressure casting or cutting machining are generally suitable, depending on the material used.

According to the invention, the cores have at least three layers in the pressing direction which have differing compressibilities, with the materials of the outer layers and thus their compressibility preferably being identical with one another. Advantageous materials for the outer layers having a relatively high compressibility are foamed polymers. Foams made of polystyrene, polyurethanes, polyolefins such as polyethylene and polypropylene or their copolymers and polymethacrylimides, e.g. poly(N-methylmethacrylimide), are all suitable. For the inner layer having a lower compressibility, preference is given to using thermoplastic polymers, in particular such which can be pyrolysed without leaving a residue. Particularly useful polymers are polystyrene and SAN, polyamides (PA) such as PA 66, polycarbonate and polyester carbonate, aromatic polyesters (polyarylates), polyimides (PI) such as polyetherimide (PEI) or modified polymethacrylimide (poly(N-methylmethacrylimide), PMMI), polyoxymethylene (POM) and polyterephthalates (PETP, PBTP) and also copolymers of the polymers mentioned.

The layer thicknesses in the pressing direction are, in the case of three layers, preferably from 10% to 40% of the total thickness of the core in the pressing direction for each of the outer layers and that of the inner layer is from 20% to 80% of the total thickness, particularly preferably from 15% to 35% for each of the outer layers and from 30% to 70% for the inner layer, in particular from 20% to 30% for each of the outer layers and from 40% to 60% of the total thickness of the core in the pressing direction for the inner layer. During pressing, the compressible outer layers are compressed to from $1/10$ to $1/200$ of their original thicknesses, preferably to from $1/12$ to $1/100$ and in particular to from $1/15$ to $1/80$ of their original thicknesses, where a further decrease in the thickness may also result from melting of the material of the outer layers upon heating in the mould during pressing.

Apart from polymers which pyrolyse without leaving a residue at temperatures of at least 750° C., further suitable polymers for the inner layer are ones which are only partially pyrolized or carbonized as long as a significant (at least 50%) volume shrinkage takes place. Such polymers include, inter alia, thermosets such as phenolic resins and rigid foams formed from these. The inner layer of the cores may also be made of mixtures of materials of which part pyrolyses without leaving a residue and another part loses its original shape during pyrolysis to such an extent that it is present in the form of a loose powder or grains which do not stick together.

The process of the invention provides for mouldable compositions comprising carbon fibers, thermally curable binders and additives, in particular carbon-containing additives, to be introduced together with the above-described cores into the press mould in the second step. This determines the geometry of the body to be formed.

The carbon fiber layers of the C/C intermediate body in the vicinity of the core are preferably built up on the core in the prescribed preferential direction of the reinforcing carbon fibers. For this purpose, preference is given to using mouldable compositions containing carbon fibers having a mean length of at least 5 mm. Particular preference is given to mouldable compositions in which carbon fibers are present in the form of short fiber bundles having a mean length of not more than 50 mm and the fibers have a coating of pyrolytic carbon formed by carbonization of polymers, resins or pitches. The mouldable composition is then preferably introduced into the mould so that the carbon fibers are predominantly oriented parallel to the direction of highest tensile stress in the resulting shaped part. In this context, predominantly means at least 50%. Carbon threads which are laid in a parallel direction and bound together (known as tapes or "UDTs"=unidirectional tapes) may also be wound around the cores and this layer may be fixed, if appropriate, by means of thermally curable binders. Further mouldable compositions having a shorter fiber or fiber bundle length are then usually applied in layers onto this layer of preferentially oriented carbon fibers or threads.

In another preferred embodiment, carbon fibers are used in the form of coated short fiber bundles. Particular preference is in this case given to fibers coated with graphitized carbon, or fiber bundles having mean lengths of less than 5 mm.

Fiber bundles usually are made up of a plurality of individual fibers, eg. 500 to 100 000. As thermally curable binders, use is made of pitches such as coal tar pitch or petroleum pitch and/or, preferably, curable resins such as phenolic resins, epoxy resins, polyimides, filler-containing mixtures with furfuryl alcohol or furan resins. For this purpose, the compositions are introduced into a press mould provided with "lost cores" as described supra. The cores occupy the space corresponding to the hollow spaces or recesses later to be formed in the composite ceramic.

In the third step, the required pressure is applied to the filled mould by means of the punch and the composition is pressed to form green bodies comprising the said cores.

In the fourth step, the pressed body is cured by thermal treatment. Curing can be carried out separately, i.e. after pressing, for example in an oven. It is also possible, in a heatable press, to commence curing during pressing, either simultaneously with this or with a time delay. Curing in the mould places fewer demands on the coherence of the pressed but still uncured body.

After curing, the cured green body is converted together with the core into the C/C state, i.e. carbonized, in the fifth step. This is generally effected by heating under protective gas (nitrogen) or under reduced pressure to temperatures in the range from about 750° C. to 1 100° C. If the body is heated to temperatures above about 1 800° C., graphitization of the carbon additionally occurs.

After carbonization of the green body, any pyrolysis residues or carbon residues in the hollow spaces formed by decomposition of the core material are removed and a porous C/C body with hollow spaces or recesses which can be utilized further is obtained. It can be machined further or in turn assembled or adhesively bonded together to form more complex structures.

In a preferred embodiment of the process of the invention, the carbon of the C/C body is, in the sixth step, at least partly converted by melt infiltration with metals and, if necessary, subsequent heat treatment into the corresponding carbides. Preference is given to melt infiltration with silicon, in which case at least part of the carbon (preferably the carbon of the matrix) is converted into silicon carbide; the matrix then comprises SiC, unreacted carbon and unreacted silicon. For this purpose, a layer of silicon powder is placed over the C/C body and the body is heated to temperatures of from about 1 500° C. to about 1 800° C. under reduced pressure. Depending on the intended use, it is not absolutely necessary for the entire C/C body to be converted into C/SiC, but at least the outer layer is usually converted into C/SiC. Although silicon melt infiltration is the preferred process, the C/C body can also be post-densified by other conventional processes to form matrices customary in composite materials technology. In particular, melt siliconisation can also be carried out using silicon alloys comprising, inter alia, metals such as chromium, iron, cobalt, nickel, titanium and/or molybdenum.

The process described is preferably used for producing brake disks or clutch disks. In this case, the mouldable composition and at least one core are introduced into a cylindrical mould. In the case of brake disks, the thickness of the bottom layer and covering layer (below and above the core zone, respectively) is preferably at least 5 mm after pressing. These layers form the friction layers of the brake or clutch disk. The shape of the brake or clutch disk is preferably that of an annular disk, i.e. the region around the axis is empty over the entire thickness of the disk. The shape and arrangement of the core or cores is preferably such that the hollow spaces formed extend from the periphery of the cylindrical body to the inner edge of the annulus and thus form an open passage between the inner and outer cylindrical surfaces of the annular disk. This produces internally ventilated brake or clutch disks having radial ventilation channels.

The internally ventilated brake or clutch disks produced by the process of the invention can be used for automobile and lorry brakes, for aircraft and rail vehicles and for friction clutches in drives of all types. Such brake disks or clutch disks are connected to a hub which in turn may be fixed to an axis. Hollow bodies produced in this way can likewise be used for a variety of purposes as components in tool and machine construction.

The invention claimed is:

1. A process for producing hollow bodies comprising fiber-reinforced ceramic materials, which comprises
    in a first step, producing compressible cores whose shape corresponds, at least in the plane perpendicular to the pressing direction, essentially to the geometry of the hollow spaces to be formed,
    in a second step producing a green body by introducing the said compressible cores and a mouldable composition comprising binder and fiber material into a mould,
    in a third step, pressing the composition containing fiber material with a pressure of from 0.1 MPa to 50 MPa so that the core is compressed in the pressing direction by at least 5% of its dimension in the pressing direction, which cores have at least three layers in the pressing direction of the third step, where the compressibility of directly adjacent layers differs for these said layers, and the compressibility of, the outermost layer is at least twice that of the inner layer, wherein the outer layers are made of foamed polymers and wherein the inner layer is made of thermoplastic materials which thermoplastic materials have a heat distortion temperature of at least 150° C., and a ball indentation hardness of at least 30 MPa, the thickness of the outer layers being from 10% to 40% of the total thickness of the core in the pressing direction for each of the outer layers, and from 20% to 80% of the total thickness in the pressing direction for the inner layer,
    in a fourth step, curing the composition comprising fiber material to form a cured green body,
    in a fifth step carbonizing the cured green body by heating to a temperature of from about 750° C. to about 1100° C. in a nonoxidizing atmosphere to produce a C/C body,
    where the cores consist of material which pyrolyses in the fifth step or is at least partially pyrolysed with volume shrinkage, wherein during pressing, the outer layers are compressed to from ⅒ to 1/200 of their original thickness.

2. The process as claimed in claim 1, wherein, subsequent to the fifth step,
    the C/C body is in a sixth step infiltrated with a liquid metal with retention of its shape and with an at least partial reaction of the carbon component of the matrix of the C/C body with the metal occurring to form carbides.

3. The process as claimed in claim 1, wherein
    in the fourth step the composition comprising fiber material is cured by heating to a temperature of from 120° C. to 280° C.

4. The process as claimed in claim 1, wherein the third and fourth steps are carried out simultaneously or partly overlapping in time.

5. A process for producing hollow bodies comprising fiber-reinforced ceramic materials, which comprises
    in a first step, producing compressible cores whose shape corresponds, at least in the plane perpendicular to the pressing direction, essentially to the geometry of the hollow spaces to be formed,
    in a second step producing, a green body by introducing the said compressible cores and a mouldable composition comprising binder and fiber material into a mould,
    in a third step, pressing the composition containing fiber material with a pressure of from 0.1 MPa to 50 MPa so that the core is compressed in the pressing direction by at least 5% of its dimension in the pressing direction, wherein the cores have three layers in the pressing direction of the third step, where the compressibility of directly adjacent layers differs for these said layers, and the compressibility of the outermost layers is at least twice that of the inner layer, wherein the outer layers are made of foamed polymers and wherein the inner layer is made of thermoplastic materials which thermoplastic materials have a melting point in the range of 220° C. to 280° C., a heat distortion temperature of at least 150° C., and a ball indentation hardness of at least 30 MPa, and the thicknesses of the outer layers are each from 15% to 35% of the total thickness of the core in the pressing direction, and the thickness of the inner layer is from 30% to 70% of the total thickness of the core in the pressing direction,
    in a fourth step, curing the composition comprising fiber material to form a cured green body,
    in a fifth step carbonizing the cured green body by heating to a temperature of from about 750° C. to about 1100° C. in a nonoxidizing atmosphere to produce a C/C body,
    where the cores consist of material which pyrolyses in the fifth step or is at least partially pyrolysed with volume shrinkage, wherein during pressing, the outer layers are compressed to from ⅒ to 1/200 of their original thicknesses.

6. The process as claimed in claim 1, wherein the compressible outer layers are compressed to from 1/12 to 1/100 of their original thickness during pressing.

7. The process as claimed in claim 1, wherein the outer layers of the cores are melted during pressing.

8. The process as claimed in claim 1 wherein the hollow body is in the form of an annular disk in which at least one hollow space extends from the periphery to the inner edge of the annular disk.

9. The process of claim 5, wherein, subsequent to the fifth step,
    the C/C body is in a sixth step infiltrated with a liquid metal with retention of its shape and with an at least partial reaction of the carbon component of the matrix of the C/C body with the metal occurring to form carbides.

* * * * *

UNITED STATES PATENT AND TRADEMARK OFFICE
CERTIFICATE OF CORRECTION

PATENT NO. : 7,276,203 B2
APPLICATION NO. : 10/741374
DATED : October 2, 2007
INVENTOR(S) : Arno Sommer et al.

It is certified that error appears in the above-identified patent and that said Letters Patent is hereby corrected as shown below:

On the Title Page:

In the Title, "Process for producing hollow comprising fiber-reinforced ceramic materials" should read -- Process for producing hollow bodies comprising fiber-reinforced ceramic materials--.

Signed and Sealed this

Eighteenth Day of December, 2007

JON W. DUDAS
*Director of the United States Patent and Trademark Office*